United States Patent Office 3,135,657
Patented June 2, 1964

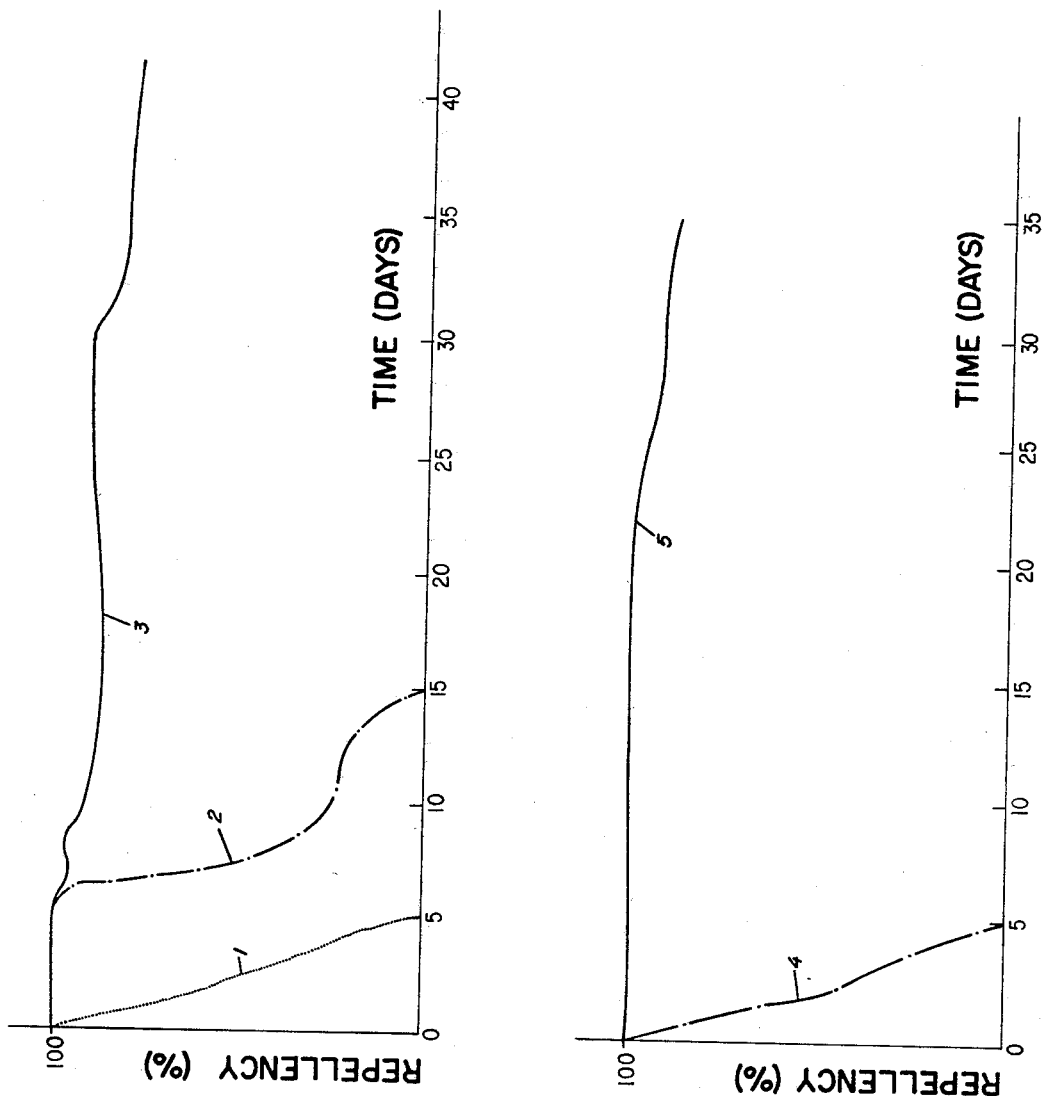
INVENTORS,
Miyoshi Noda
Shigenobu Nakajima

3,135,657
RODENT REPELLENT COMPOSITIONS
Miyoshi Noda, Asahi-ku, Osaka, and Shigenobu Nakajima, Kitakawachigun, Osaka, Japan, assignors to Matsushita Electric Works, Ltd., Kitakawachigun, Osaka, Japan
Filed Feb. 27, 1962, Ser. No. 176,075
Claims priority, application Japan Mar. 1, 1961
8 Claims. (Cl. 167—46)

This invention relates to novel rodent-repellent compositions and methods for producing such compositions. More particularly, this invention relates to rodent-repellent compositions comprising, as essential ingredients, [3-2-(3,5-dimethyl-2-oxo-cyclohexyl) - 2 - hydroxyethyl] glutarimide, γ-benzene hexachloride, dichlorodiphenyltrichloroethane, and if desired a mercaptan-formaldehyde resin, and also to their production. This invention also relates a method for preventing rodent attack.

It is well known that economic loss due to the attack of rats and other rodents against various farm field products, buildings and equipments, and particularly packaged goods is so considerable that the need for reducing such damage has been increased.

Thus, there has hitherto been proposed a number of rodent-repellent chemicals including lauric nitrile, 1,3,5-nitrobenzene-aniline complex, thiouronium, mercaptans, zinc dimethyldithiocarbamate-cyclohexylamine complex and [3-2-(3,5 - dimethyl- 2 - oxocyclohexyl)-2-hydroxyethyl] glutarimide (herein later referred to as "cyclohexamide"), etc. Among the known repellent compounds, cycloheximide has been found most effective. However, cycloheximide has various drawbacks when used as a rodent repellent. Among the drawbacks, most serious is in that its repellent effect is non-uniform or lacking in reemergency. In other words, its effect in stopping rodent attack varies at random considerably depending upon the time and/or place even when used under the same condition. Further drawback of cycloheximide as a rodent-repellent is in its toxity. The oral toxity of cycloheximide is $LD_{50}$ 3.76 mg./kg. (mouse) and $LD_{50}$ 4.4 mg./kg. (rat). Furthermore, cycloheximide is very expensive. Therefore, it is obvious that the amount of cycloheximide to be used per unit area should be as little as possible. However, in conflict therewith, no desired rodent-repellent effect is obtained unless a relatively high concentration (at least about 0.3 g. or 0.5 g. of cycloheximide per square meter) is used. For these reasons, cycloheximide (although found more effective than others) has not been satisfactorily and extensively commercialized or employed as a rodent-repellent agent.

Unexpectedly, we have found that when cycloheximide is used in combination with γ-benzenhexachloride (hereinafter referred to as γ-BHC) and dischlorodiphenyltrichloroethane (hereinafter referred to as DDT), all of the above mentioned drawbacks are overcome. The exact reason for this unexpected result has not been known, but it is believed that there should be a certain synergetic effect among these ingredients as discussed below.

γ-BHC and DDT are well known as insecticides but have not been used as rodent-repellents. In fact, no noticeable rodent-repellent effect would be seen unless under a considerably high concentration when γ-BHC alone or DDT alone is used as such or as a sole active ingredient in a rodent-repellent composition. Thus, for example, when γ-BHC alone is employed no noticeable rodent or rat repellent effect is obtained below a concentration of about 8 g. of α-BHC per square meter. When DDT alone is used a still higher concentration is required. However, when γ-BHC and/or DDT is applied (as a surface coating) in such a high concentration on the surface such as of packing or wrapping paper or cloth it will crystallize out and deposit on said surface, and therefore the appearance will be spoiled and no satisfactory bonding or adhesion thereof is obtained. In addition, the problem of toxity is encountered with such high concentration of γ-BHC and/or DDT.

It has been found, however, that when cycloheximide, γ-BHC and DDT are used in combination an excellent, continuously effective and substantially constant (without random variation in effect) repellent effect is obtained with a remarkably low concentration. Thus, according to this invention, when the composition is applied as a surface coat on packaging or wrapping materials such as paper sheet, paper-board, cloth or the like, a concentration of 0.005 g.–0.4 g. of cycloheximide, 0.05 g.–4 g. of γ-BHC and 0.05 g.–4 g. of DDT per square meter of the surface is used. The composition may also be sprinkled or sprayed on building floor and wall, and farm field in the above mentioned concentrations.

It has further been found that when the above mentioned ingredients (cycloheximide, γ-BHC and DDT) are combined with a mercaptan-formaldehyde resin the rodent-repellent effect is further improved.

N-butylmercaptan is known as a sulfur-containing organic compound having a rodent-repellent odor. However, this compound is a liquid having a boiling point of 97–98° C. and slowly evaporates even at room or normal temperature so that it is impossible to retain the desired repellent odor for a prolonged period of time. We have found however that when a mercaptan is condensed with formaldehyde under heating and in the presence of a catalyst, the resulting high molecular product or resin (hereinafter referred to as "mercaptan-formaldehyde" resin) retains the desired repellent odor of the mercaptan while the boiling point is increased, so that the resin, when applied as a rodent-repellent, shows desired repellency to rodents for a prolonged period of time. When the resin alone is used, however, a relatively large amount (e.g. at least about 2.0 g./m.²) is required to obtain the desired repellent effect. Such a high concentration has disadvantages that the unpleasant odor is too strong for man and the goods to be protected tend to be infected with such unpleasant odor.

We have found that when a very small amount (0.01 to 0.5 g./m.²) of such a mercaptan-formaldehyde resin is added to the beforementioned composition of cycloheximide, γ-BHC and DDT the rodent-repellent effect is further improved without accompanying the aforementioned disadvantage of the resin.

The mercaptan-formaldehyde resins are known in the art, e.g. U.S. Patent No. 1,960,262, dated May 29, 1934, and "Synthetic Resin" by Ellis. Any suitable mercaptan, condensation conditions, catalysts, etc. described in these known literatures may be used in producing the mercaptan-formaldehyde resins useful in this invention, so that no detailed explanation will be necessary. The production itself of the resins does not constitute a part of the invention.

From the above, it will be understood that the essential feature of the present invention is in the use of a combination of cycloheximide, γ-BHC, DDT and if desired a mercaptan-formaldehyde resin, preferably in the proportion by weight of 0.005–0.4 part, 0.05–4 parts, 0.05–4 parts and 0.01–0.5 part respectively, and the composition is applied preferably in a surface concentration of 0.005–0.4 g. of cycloheximide, 0.05–4 g. of γ-BHC, 0.05–4 g. of DDT and, if desired, 0.01–0.5 g. of a mercaptan-formaldehyde resin per square meter of a surface to be protected from rodent attack.

In applying these active repellents to the surface to be protected from rodent attack, it is preferable that these ingredients are dissolved or suspended in fluid carriers so that the resulting composition can be applied by usual technique such as surface coating, spraying, sprinkling, brushing or the like. Any of organic, inorganic and mixed liquid carriers which are compatible with the active repellent ingredients may be employed. For example, the repellent compounds are merely dissolved in their common solvent such as benzene, xylene, acetone, methanol, ethanol, propylalcohol, isopropylalcohol, n-butanol, chloroform, etc. An aqueous suspension is preferable in view of economy. For this purpose cycloheximide is dissolved in water in a concentration of, for example, 1–2%. Apart from this, γ-BHC and DDT and, if desired, a mercaptan-formaldehyde resin are dissolved in an organic solvent such as mentioned above. Generally, the solvent is used in an amount equal to one to two times (by weight) the sum of γ-BHC and DDT. To this organic solution the aqueous solution of cycloheximide is slowly added while stirring. As the addition of the aqueous solution proceeds, the type of resulting emulsion is changed from the initial W/O type wherein particles of the cycloheximide solution are dispersed in the organic solution of γ-BHC and DDT (and a mercaptan-formaldehyde resin as the case may be), into the final O/W type wherein the particles of the said organic solution are uniformly dispersed in the aqueous solution of cycloheximide. In this case it is preferable to also add an anion or non-ion surface active agent or emulsifying agent such as polyoxyethylenesorbitanmonooleate, laurylpolyoxyethylene-ether, ammonium (or calcium) salt of alkylbenzene-sulfonic acid, sulfonated castor oil in an amount from 10–100% based on the total weight of γ-BHC plus DDT, to facilitate the emulsification. The emulsification is further facilitated by heating the solutions and the mixture at a temperature from 40 to 70° C. during the mixing operation. The emulsion may be stabilized by adjusting its pH to about 5 by adding hydrochloric acid, boric acid or other inorganic acid.

If desired, the active repellent ingredients may be incorporated into conventional film forming, surface coating or adhesive compositions in order to improve water resistance and abrasion resistance when applied to a surface. These compositions may be of resin, latex, starch or other adhesive basis. The basic formulations of these compositions are well known in the art and would require no detailed explanation thereabout.

The concentration of these active repellent ingredients in the liquid compositions are not critical and may vary widely. When cost for transportion and storing is considered a high concentration is desired, whereas a low concentration is desired when toxity and handling is considered. Generally, it is preferable that the liquid composition contains about 0.05–0.5% by weight of cycloheximide.

In any case, the essential requirement is that cycloheximide is used in combination with γ-BHC and DDT and, if desired further with a mercaptan-formaldehyde resin. By this particular combination of particular rodent-repellent chemicals, the amount required for effective rodent-repellency is considerably reduced and the various drawbacks inherent to each ingredient alone are overcome. It is effective for a prolonged period of time.

As mentioned before, the composition of this invention is preferable to be used in such an amount that the surface concentrations are 0.005–0.4 g. of cycloheximide, 0.05–4 g. of γ-BHC, 0.05–4 g. of DDT and 0.01–0.5 g. of a mercaptan-formaldehyde resin (when used) per square meter of a surface to be protected by the composition from rodent attack.

The rodent-repellent composition of this invention can be applied to wrapping or packaging paper or cloth by any suitable surface coating technique such as spraying, brushing, roll-application, dipping, etc. The composition may also be applied to building floor, wall and various equipments where attack by rodent such as rats is desired to be prevented. The composition may be applied to farm field by spraying, sprinkling or scattering.

The invention is further illustrated by the following examples, it being understood that these examples are presented only as illustrative of the invention and not in limitation thereof.

EXAMPLE 1

In 150 g. of xylene were dissolved 50 g. of γ-BHC and 50 g. of DDT. After stirring the mixture, 50 g. of polyoxyethylenesorbitanmonooleate (hereinafter referred to as "TWO") were added to the mixture. While stirring, 340 g. of a 1.5% aqueous solution of cycloheximide were added dropwise to the above mixture to prepare a rodent-repellent composition in O/W emulsion type wherein fine particles of the organic solution of γ-BHC and DDT are dispersed in the aqueous solution of cycloheximide.

EXAMPLE 2

In 300 g. of xylene were dissolved 100 g. of γ-BHC and 100 g. of DDT and 100 g. of TWO were added to the resulting solution. To this mixture were added dropwise 680 g. of 1.5% aqueous solution of cycloheximide to prepare a rodent-repellent composition in the form of emulsion.

EXAMPLE 3

In 450 g. of xylene were dissolved 150 g. of γ-BHC and 150 g. of DDT, and 150 g. of TWO were added to the resulting solution. To this mixture were added 1020 g. of 1.5% aqueous solution of cycloheximide to prepare a rodent-repellent composition in the form of emulsion.

EXAMPLE 4

Example 1 was repeated by using 150 g. of γ-BHC, 150 g. of DDT, 450 g. of xylene, 150 g. of TWO and 1330 g. 1.5% aqueous solution of cycloheximide to obtain a rodent-repellent composition in the form of emulsion.

EXAMPLE 5

Example 1 was repeated by using 300 g. of γ-BHC, 300 g. of DDT, 800 g. of xylene, 300 g. of TWO and 2000 g. of 1.5% aqueous solution of cycloheximide to obtain a rodent-repellent composition in the form of emulsion.

EXAMPLE 6

Example 1 was repeated by using 400 g. of γ-BHC, 400 g. of DDT, 1200 g. of xylene, 400 g. of TWO, and 2700 g. of 1.5% aqueous solution of cycloheximide to prepare a rodent-repellent composition in the form of emulsion.

EXAMPLE 7

50 g. of γ-BHC and 50 g. of DDT were dissolved in 150 g. of xylene. To this solution were added and dissolved 10 g. of a mercaptan-formaldehyde resin obtained by isolating the oily resin precipitated at the bottom of a vessel upon cooling the product resulting from the condensation reaction between 10 kg. of thiophenol and 18 kg. of 28% formalin conducted at 60° C. for 90 minutes in the presence of a catalyst (hydrochloric acid) while stirring. To this organic solution were further added and dissolved 50 g. of TWO. While stirring, 340 g. of a 1.5% aqueous solution of cycloheximide were slowly added dropwise to the resulting organic solution to obtain a rodent-repellent composition in the form of O/W type emulsion.

EXAMPLE 8

Example 7 was repeated by using 100 g. of γ-BHC, 100 g. of DDT, 300 g. of xylene, 100 g. of TWO, 10 g. of the mercaptan-formaldehyde resin and 680 g. of a 1.5% aqueous solution of cycloheximide, to prepare a rodent-repellent composition in the form of emulsion.

EXAMPLE 9

Example 7 was repeated by using 150 g. of γ-BHC, 150 g. of DDT, 450 g. of xylene, 150 g. of TWO, 10 g. of the mercaptan-formaldehyde resin and 1020 g. of a 1.5% aqueous solution of cycloheximide to prepare a rodent-repellent composition in the form of O/W type emulsion.

EXAMPLE 10

Example 9 was repeated except using 1330 g. of 1.5% aqueous solution of cycloheximide to prepare a rodent-repellent composition in the form of emulsion.

EXAMPLE 11

Example 7 was repeated by using 300 g. of γ-BHC, 300 g. of DDT, 800 g. of xylene, 300 g. of TWO, 10 g. of the mercaptan-formaldehyde resin and 2000 g. of 1.5% aqueous solution of cycloheximide to obtain a rodent-repellent composition in the form of emulsion.

EXAMPLE 12

Example 7 was repeated by using 400 g. of γ-BHC, 400 g. of DDT, 1200 g. of xylene, 400 g. of TWO, 10 g. of the mercaptan-formaldehyde resin and 2700 g. of 1.5% aqueous solution of cycloheximide to prepare a rodent-repellent composition in the form of emulsion.

In each of the above Examples 1–12, the mixture was heated at a temperature between 40° C. and 70° C. during the addition of the aqueous solution of cycloheximide to facilitate the emulsification.

The whole of each of the compositions of Examples 1–12 was applied on the surface of 100 m.² kraft paper sheet, and surface concentrations as set forth in Table I were obtained.

Paper bags, each 5 cm. x 7 cm., were made of these paper sheets, and each bag was filled with a mixed feed composed of 50 parts of dried fish powder and 50 parts of corn powder.

Indoor Repellency Tests

Indoor repellency test for these compositions was carried out in the following manner. Inside a wooden box or room of 2.5 m. x 2.5 m., four compartments (each 20 cm. x 20 cm.) were placed. Filled bags coated with a rodent-repellent composition were placed in two of the compartments, while the same number of control bags (non-treated bags) were placed in the other two compartments. Each compartment contained 10 bags. The box and the compartments were so designed that rats had access to all the compartments under equal conditions. The box was placed in a room (at 10° C.) wherein ten rats were set free. After seven days, the number each of the treated bags and control bags attacked by the rats was checked. The tests were repeated 20 times (each seven days). The repellency was expressed numerically according to the following formula:

$$\text{Repellency (M percent)} = \frac{T_0}{T_0 + W_0} \times 100$$

where $W_0$ is the average number of repellent treated bags attacked by the rats during the whole test period and $T_0$ is the average number of control bags attacked during the same period. The results are shown in the following Table I.

TABLE I

| Ex. No. | γ-BHC (g./m.²) | DDT (g./m.²) | C.H.I. (g./m.²) | M-F resin (g./m.²) | Repellency (M, percent) |
|---|---|---|---|---|---|
| 1 | 0.5 | 0.5 | 0.05 | | 62 |
| 2 | 1.0 | 1.0 | 0.10 | | 66 |
| 3 | 1.5 | 1.5 | 0.15 | | 70 |
| 4 | 1.5 | 1.5 | 0.2 | | 75 |
| 5 | 3.0 | 3.0 | 0.3 | | 81.5 |
| 6 | 4.0 | 4.0 | 0.4 | | >90 |
| 7 | 0.5 | 0.5 | 0.05 | 0.1 | 66 |
| 8 | 1.0 | 1.0 | 0.10 | 0.1 | 70 |
| 9 | 1.5 | 1.5 | 0.15 | 0.1 | 74 |
| 10 | 1.5 | 1.5 | 0.2 | 0.1 | 79 |
| 11 | 3.0 | 3.0 | 0.3 | 0.1 | 84 |
| 12 | 4.0 | 4.0 | 0.4 | 0.1 | >95 |
| A | | | 0.5 | | 61 |
| B | 5.0 | 5.0 | | | 58 |

Remarks:
C.H.I. _____ cycloheximide.
M-F resin _____ mercaptan-formaldehyde resin of Example 7.

Field Tests (A)

Paper bags, each 30 cm. x 20 cm., were made of kraft paper. The bags were grouped into three groups (each 20 bags in number), namely (1) 20 bags not coated with any repellent chemical, (2) 20 bags coated with cycloheximide in a surface concentration of 0.5 g./m.², and (3) 20 bags coated with the composition of Example 12 in a surface concentration as indicated in the column of Example No. 12 of Table I.

Each of these bags was filled with 500 g. of dry fish powders. The bags were placed in the barns, kitchens and warehouses in Ise City, Mie Prefecture, Japan, and kept under surveillance for 40 consecutive days. In carrying out the tests, a set of three bags taken from the three groups (1), (2) and (3) respectively was placed at each spot in such a manner that rats are accessible equally to any of the three bags. All the bags that have been known by rats were withdrawn from the spots. The results are shown in the figure wherein the vertical axis Y represents the percentage (based on the total number or twenty) of the number of the bags remained without having been attacked by rats for each of the groups (1), (2) and (3), while the horizontal axis represents the time (in days) after starting the tests. Indicated with the numbers 1, 2 and 3 denote the curves respectively for the above mentioned groups (1), (2) and (3). It will be apparent from these curves that the control or non-treated bags were all attacked by rats within the first few days, while the bags treated with cycloheximide alone began to be attacked around the fifth day and all of them were damaged in about 15 days. In contrast the bags treated with the composition of this invention were substantially free from rat attack even after 40 days and found to have a high repellency.

Field Tests (B)

Paper bags, each 30 cm. x 20 cm., were made of kraft paper. The bags were grouped into two, one group not coated or treated with any repellent and the other coated with the composition of Example 4 in a surface concentration as indicated in the column of Example No. 4 of Table I. Each bag was filled with 500 g. of dry fish powders. These bags are subjected to test in a manner similar to the above mentioned Field Tests (A) at chow store room and barns of a hennery in Nagayoshi-Town, Osaka Prefecture, Japan. The results of observation are plotted in FIG. 2, in which the numeral 4 denotes the curve for the control or non-treated bags, while the curve 5 is for the bags treated with the composition of Example 4. It will be seen from these curves that the control bags were all attacked in a few days, while the bags treated with the composition of this invention were substantially free from rat attack even after 35 days.

What we claim is:
1. A rodent-repellent composition which comprises, as essential ingredients, cycloheximide, γ-BHC and DDT in the proportions by weight of 0.005–0.4 part, 0.05–4 parts and 0.05–4 parts respectively.

2. A rodent-repellent composition which comprises, as essential ingredients, cycloheximide, γ-BHC, DDT and thiophenol-formaldehyde resin in the proportions by weight of 0.005–0.4 part, 0.05–4 parts, 0.05–4 parts and 0.01–0.5 part.

3. A rodent-repellent composition which comprises, cycloheximide, γ-BHC and DDT dissolved in an organic solvent in the proportions by weight of 0.005–0.4 part of cycloheximide, 0.05–4 parts each of γ-BHC and DDT.

4. A rodent-repellent composition which comprises, cycloheximide, γ-BHC and DDT suspended in an organic solvent and water mixture in the proportions by weight of 0.005–0.4 part of cycloheximide, 0.05–4 parts each of γ-BHC and DDT.

5. A rodent-repellent composition which comprises, cycloheximide, γ-BHC, DDT and thiophenol-formaldehyde resin dissolved in an organic solvent in the proportions by weight of 0.005–0.4 part of cycloheximide, 0.05–4 parts of each of γ-BHC and DDT, and 0.01–0.5 part of the mercaptan-formaldehyde resin.

6. A rodent-repellent composition which comprises, as essential ingredients, cycloheximide, γ-BHC, DDT and thiophenol-formaldehyde resin dispersed in an organic solvent and water mixture in the proportions by weight of 0.005–0.4 part of cycloheximide, 0.05–4 parts of each of γ-BHC and DDT, and 0.01–0.5 part of the mercaptan-formaldehyde resin.

7. A method for preventing rodent attack which comprises applying to a surface to be protected from rodent attack cycloheximide, γ-BHC and DDT in a surface concentration of 0.005–0.4 g. of cycloheximide, 0.05–4 g. of γ-BHC and 0.05–4 g. of DDT per square meter.

8. A method for preventing rodent attack which comprises applying to a surface to be protected from rodent attack cycloheximide, γ-BHC, DDT and thiophenol-formaldehyde resin in a surface concentration of 0.005–0.4 g. of cycloheximide, 0.05–4 g. of each of γ-BHC and DDT, and 0.01–0.5 g. of said thiophenol-formaldehyde resin per square meter.

References Cited in the file of this patent

Bellack et al.: "Relationship Between Chemical Structure and Rat Repellency," Chemical-Biological Coordination Center Review No. 5, National Research Council, Washington, D.C. (1953), pages 94, 104, 150 and 151.

Welch: Agricultural and Food Chemistry, vol. 2, No. 3, February 1954, pages 142–149 (particularly 149).

Mallis: Handbook of Pest Control, 3rd ed. (1960), page 91, published by MacNair-Dorland Co., 254 W. 31st St., New York 1, N.Y.

American Nurseryman, vol. 104, page 64, Dec. 1, 1956.